March 28, 1944.         E. K. FALLS         2,345,389
MAXIMUM CAPACITY SAFETY VALVE
Filed Feb. 5, 1943
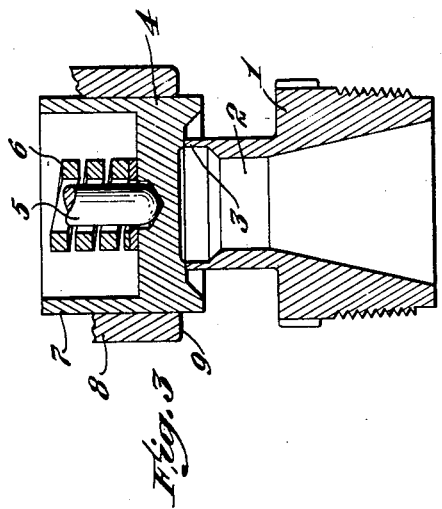
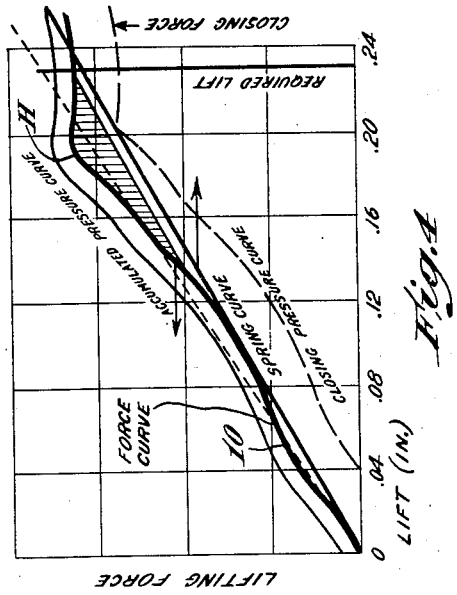
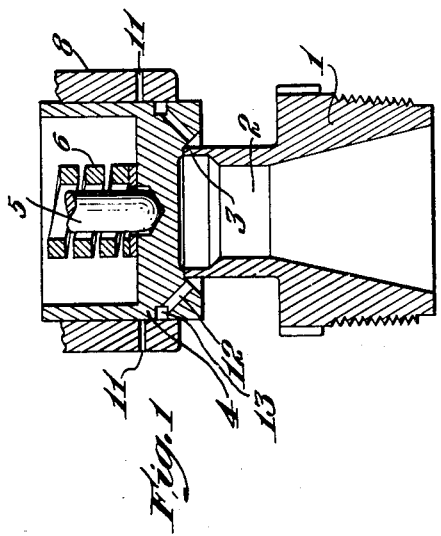
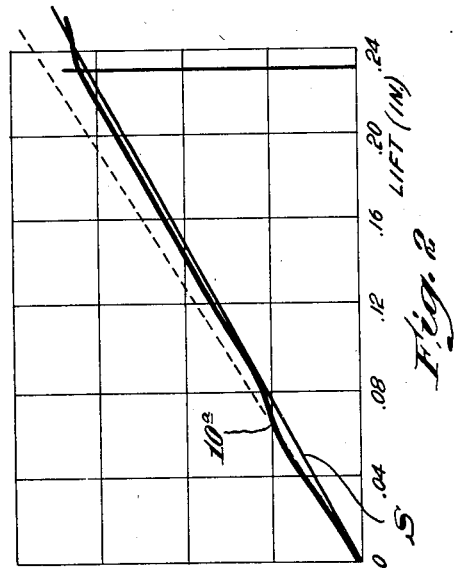
Inventor
Eugene K. Falls
by Roberts Cushman & Woodberry
Attys.

UNITED STATES PATENT OFFICE 2,345,389

MAXIMUM CAPACITY SAFETY VALVE

Eugene K. Falls, Potsdam, N. Y., assignor to Manning, Maxwell & Moore, Incorporated, New York, N. Y., a corporation of New Jersey Application February 5, 1943, Serial No. 474,772

7 Claims. (Cl. 137—53)

This invention relates to safety valves of that kind generally referred to in the art as "pop" safety valves, and relates more particularly to a valve of the so-called full-capacity type which, when wide open, admits passage therethrough of substantially that quantity of fluid which would flow through the throat or seat bushing of the valve if the valve feather or disk and the superstructure were removed and the fluid allowed to escape freely to the atmosphere. This represents substantially perfect theoretical efficiency since an aperture of any given size and shape has its own maximum limit of delivery capacity when delivering against any substantially constant pressure.

Pop safety valves are widely used upon steam boilers, oil stills, compressed air tanks, superheaters, and other containers for fluid or gas under pressure. Such valves usually comprise the following essential elements: (1) a "throat" passage which may be any relief opening from the fluid container and which terminates at the annular valve seat; (2) a valve disk, valve head or "feather" which cooperates with the valve seat to close the throat passage but which may lift from the seat to permit escape of fluid; (3) a stem or spindle whose lower end engages the disk; (4) a coiled spring coaxial with the stem and which urges the disk or feather toward the seat in opposition to the pressure of the fluid in the throat; and (5) a suitable casing for supporting, guiding and housing the various operative elements of the valve structure. In valves of the full-capacity type there is usually provided some deflecting element associated with the valve feather or its guide for changing the direction of the fluid escaping between the valve seat and the feather, thereby to establish a reaction force which increases the effective lifting force as the feather rises from the seat thereby to counteract the increasing spring resistance.

The flow of fluid from a vessel through an orifice in the vessel wall depends in general upon the initial conditions within the vessel and the final conditions at the discharge end of the orifice. If the initial pressure, temperature, and specific volume are held constant, the weight rate of flow increases as the discharge pressure is lowered. For a smoothly rounded entrance type of orifice, termed a flow-nozzle, or an orifice that has a gradual reduction of cross-sectional area, the flow continues to increase as the discharge pressure is lowered until the ratio of the pressure (at the section of smallest cross-sectional area) to the initial pressure reaches a definite value, termed the critical flow pressure ratio. For this condition the pressure at the section of smallest cross-sectional area, termed the "throat," is the same as the pressure at the discharge end of the nozzle. Further reductions of the discharge pressure do not affect the pressure at the throat and hence the flow remains constant at the maximum possible for the minimum area and constant initial conditions. This is due to the fact that the fluid attains a definite maximum velocity at the throat, termed the "acoustic velocity," once the critical flow pressure ratio has been established. This is the velocity at which small pressure disturbances are transmitted through a fluid in all directions from the source of disturbance. If the fluid is in motion this velocity is relative to the moving stream or jet. Hence, although any pressure disturbance, such as reduction of pressure beyond the throat section, is transmitted upstream toward the throat within the jet, it remains stationary with respect to the nozzle or is swept away by the fluid if the jet velocity at this point is greater than the acoustic velocity.

To obtain a maxmium capacity safety valve for a given size nozzle, the throat section of the valve must be unobstructed by guiding wings and the disk lift must be high enough to allow the fluid to attain the acoustic velocity at the throat. As the valve head, valve disk or feather lifts from its annular seat, a minimum area, annular orifice, created between the seating surfaces on the feather and the seat (which defines the upper end of the nozzle or throat) or between the feather and a ring coaxial with the throat, progressively increases in size. Accompanying this action is an increase in the rate of fluid flow which will reach a maximum possible value at some minimum lift position provided that the acoustic velocity occurs in the throat. In the past it has been assumed that this maximum capacity in a safety valve was attained when the minimum annular area between the feather and seat became equal to the throat area of the valve nozzle.

For a flat seat this occurs at a lift $h$ approximately 0.25 of the throat diameter $D$. That is, $$h \times \pi D = \frac{\pi D^2}{4}$$

from which $$h = \frac{D}{4} = 0.25D$$

However, it has been found by experiment that the abovementioned assumption is not a valid one. In the Ohio State University Engineering Experiment Station Bulletin No. 110 (Steam flow through safety valves) it is demonstrated conclusively that the lift of a safety valve disk must be such as to provide a minimum annular area at the seating surfaces much in excess of the throat area in order that maximum flow be obtained. Due to the various shapes of the flow passages beyond the end of the throat, sharp edges protruding into the fluid stream, and the increase of specific volume and the change of direction of the fluid stream after it leaves the throat, it has been found that the size of the minimum annular area at the seating surfaces alone does not determine the rate of flow. This is illustrated by Fig. 32, page 47 of the above-mentioned bulletin, which shows that although the throat area is constant, the minimum lift, and likewise the minimum annular area, required to produce maximum flow is variable. The ratio of the disk lift to the throat diameter is herein termed the "lift ratio."

A comparison of Figs. 29, 32 and 36 of the above bulletin shows that the shape of the flow passage materially affects the minimum lift required for maximum flow. The usual disk type of feather for a high capacity valve has a depending cone or tip that extends below the plane of the seat surface on the disk. With this type of disk, the inside diameter of the seat surface is larger than the throat diameter. When the valve is open, the lower end of the tip is above the end of the throat section so as to not decrease the throat area. Even though the cross-sectional area of the nozzle above the throat is at least equal to the throat area, experiments on this type of disk show that the minimum lift necessary for maximum flow is decreased somewhat when this tip is removed and further decreased if the disk surface inside of the seat is slightly recessed. A probable cause for this kind of action may be due to the tip causing interference with the stream leaving the throat section. It should be noticed, however, that even with the most favorable combination as regards the form of the flow passage at either the seating surfaces or the center of the disk, the minimum lift ratio required for maximum discharge is greater than 0.25.

A principal object of the invention is to provide a safety valve of the high capacity type wherein the valve feather lifts to such an extent as to insure substantially maximum efficiency of flow through the throat, but which at the same time has a low blow down, that is to say, a blow down not exceeding 4%, or in other words to provide a pop valve of such construction that its characteristic force curve approximately parallels the spring curve and lies close to it up to the desired value of maximum lift.

A further object is to provide an improved method of controlling pop safety valves. A further object is to provide a pop safety valve of simple and inexpensive construction, but which has the above-named desirable capacities. It is a further object of the present invention to provide means whereby existing safety valves of high capacity type may, without expensive or difficult alteration, be made to operate with a very low blow down. Other and further objects and advantages of the invention will be pointed out in the following more detailed description and by reference to the accompanying drawing, wherein Fig. 1 is a fragmentary vertical section showing the throat, valve seat, valve feather, and valve guide of a pop safety valve of otherwise conventional type embodying the present invention;

Fig. 2 is a sketch illustrating the relation of the forces which act on a valve constructed in accordance with the present invention;

Fig. 3 is a view similar to Fig. 1 but illustrating a high capacity valve of usual prior practice; and Fig. 4 is a diagram illustrating the relation of the forces which act on the feather of a pop safety valve such as shown in Fig. 3.

In designing a valve to have a lift high enough to secure approximately maximum nozzle flow, one must know the relation between the forces tending to open the valve with those tending to close it. At the closed position of the valve immediately prior to opening, the upward force, due to the static pressure of the fluid, is in equilibrium with the downward force due to the set spring compression and the weight of all the parts that lift. For any lift above the closed position, an additional force, hereinafter termed the "closing force," is exerted by the spring that is directly proportional to the amount of lift and which opposes the lifting of the valve. This closing force is zero when the valve is closed and is represented by a straight line curve, hereinafter called the "spring curve."

It is a fact well known to designers of safety valves that for every safety valve design there is a characteristic "force curve" which represents the relation between (1) the net upward lifting force of the fluid flowing through the valve (due to an initial pressure equal to the set popping pressure) above that exerted by the fluid when the valve is just ready to open, that is, at the set popping pressure, hereinafter termed the "lifting force," and (2) the lift of the valve. The force curve for any given valve design is obtained by plotting measured values of the lifting force against the corresponding values of lift throughout the range of required lift. During this measurement, the initial pressure is maintained constant, and if the fluid is a gas or superheated vapor, the initial temperature is likewise held constant. The lifting force has a general tendency to increase from zero at the closed position to a maximum at some value of lift and then to remain practically constant or decrease for higher lifts.

Once the feather starts to lift, the action continues so long as the lifting force is greater than the closing force, that is, the ordinates of the force curve are above those of the spring curve, and ceases when a condition of equilibrium is reached between the two forces, which is at the intersection of the two curves. An increase of the initial pressure increases the lifting force and is represented by a curve that is similar in shape to the force curve and lies above it. If, after the feather has lifted to a position of equilibrium, the fluid pressure is increased above the initial pressure to some higher pressure called the "accumulated pressure," the feather lifts further to a new condition of equilibrium corresponding to the intersection of the accumulated pressure curve with the spring curve. The opposite effect is true for a reduction of pressure. Thus, all equilibrium positions are represented by points on the spring curve that are the intersections with the spring curve of curves for various initial fluid pressures.

As the initial pressure is lowered, the feather seeks lower lift positions, represented by consecutive points along the spring curve until the condition represented by the intersection of the closing pressure curve with the spring curve is reached. At this lift the lifting force curve does not cross the spring curve but becomes tangent to it. For lifts smaller than this the closing force is greater than the lifting force at the closing pressure and consequently the valve suddenly closes from this lift position.

The difference between the opening and closing pressures is called the "blow down." The maximum value of this difference is limited by the A. S. M. E. boiler code to 4% of the initial or popping gauge pressure. Likewise the code capacity of a value is determined at an accumulated pressure that is 103% of the popping pressure. In order to reduce the blow down and still maintain the required lift, the difference in lifting force between the force curve and the closing pressure curve at the point of tangency of the closing pressure curve with the spring curve must be kept to a minimum value. To do this the force curve must approximately parallel the spring curve and lie close to it up to the desired value of lift.

In the development of the present invention, wherein extended experimentation was carried out in the effort to develop a maximum capacity spring-loaded safety valve, it became apparent that there were certain fundamental deficiencies in prior methods which had been attempted for the solution of this problem. In Fig. 3 there is illustrated a valve design quite similar in general to prior constructions intended to provide for maximum capacity. The essentials of this valve as shown in Fig. 3 comprise the nozzle 1 having therein the throat passage 2 terminating at its upper end at the annular valve seat 3. The valve head or feather 4, having the stem 5, is normally held against the seat by the usual coil spring 6. The valve head or feather has a skirt portion 7 which telescopes within a normally fixed cylindrical (although, if desired, adjustable) guide 8 whose lower edge 9 is in a plane adjacent to the plane of the valve seat, so that it interferes with the normal free outward flow of fluid escaping over the valve seat and deflects such fluid downwardly thus producing a reactive force which assists in raising the valve head or feather to maximum lift in opposition to the spring 6. From actual flow tests of a valve designed like that of Fig. 3 and having a ¾" throat, it was found that the required lift for maximum flow was approximately 0.23". Fig. 4 is a diagram in which the heavy line 10 represents the force curve of the valve of Fig. 3. This curve has a large hump H at the upper portion of the lift. This hump is located at that part of the curve which corresponds to the upper half of the lift, that is, to that portion of the lift which is more than 0.12 inch. It has been found that this hump in the force curve is characteristic of almost any prior valve design which approaches the full bore or maximum capacity idea. Recalling that in order that the valve may have both the desired maximum lift and required minimum blow down, the force curve should substantially coincide with the spring curve, it is evident that a valve constructed like that of Fig. 3, even though it may have the desired maximum capacity, will not have a proper blow down. If the lifting force between points representing lifts of 0.12 inch and 0.23 inch respectively could be reduced, that is to say, if the shaded area in the diagram could be substantially eliminated, the desired high lift and low blow down conditions would be much more nearly attained.

As already noted, the departure of the actual force curve from the theoretical straight line force is confined to the upper part of the curve, that is to say, to that portion of the curve which corresponds to the upper half of the total lift. Furthermore the departure of the actual force curve from the spring curve increases to a maximum at approximately ⅝ of the maximum lift and then decreases so that the curves intersect substantially at full lift. In other words, the jet effect which is responsible for the abnormal lifting force first increases and then decreases. Obviously any attempt to bring the actual force curve into agreement with the spring curve must take account of this decreasing jet effect as full lift is approached, otherwise, in the attempt to correct the operation, insufficient force may be available to provide for the final and full lift of the valve.

While others have previously noted the lack of coincidence of the actual force curve with the theoretical curve, and while efforts have been made to reduce the jet effect responsible for this lack of coincidence, no one previously, so far as is known, has ever recognized the necessity nor provided for so varying the compensating factor as to cause the force curve to approximate a straight line even at points corresponding to the upper ⅛ of the total lift.

The improved valve construction shown in Fig. 1 substantially meets this requirement. In this valve of Fig. 1 the parts are substantially identical with those illustrated in Fig. 3, except that, at the lower part of the fixed guide cylinder 8, one or more delivery orifices 11 are provided. As here illustrated several such orifices 11 are provided, such orifices preferably being spaced equidistantly about the periphery of the cylinder 8. The valve head 4 is furnished with a plurality of ports 12 which extend upwardly and outwardly from the under surface of the valve head at a point just outside of the valve seat to the periphery of the valve head. These ports are preferably inclined upwardly as shown in Fig. 1, and are so located, relatively to the orifices 11, that the delivery ends of ports 12 do not begin to lap over the inner ends of orifices 11 until the valve head has passed the half way point in its lift, that is to say, referring to Fig. 2, until it has lifted approximately 0.12 inch. The orifices 11 are fully registered with ports 12 at approximately 0.20 inch lift, and then the ports 12 gradually move out of registry with the orifices 11 as the valve head completes its rise to full lift of approximately 0.23 inch.

As illustrated in Fig. 1, the ports 12 actually terminate at a circumferential port or groove 13 in the outer surface of the valve head, the provision of this circumferential port 13 making it unnecessary to provide against any turning of the valve head about its axis, as would be necessary if the ports 12 were individually required to register with the orifices 11. However, if desired, the port 13 may be omitted since it performs no other function than to provide a certain path of communication between the ports 12 and the orifices 11, and (if proper care be taken to prevent rotation of the valve head) the ports 12 and the orifices 11 may be caused to register without the provision of the port 13. This new construction, as illustrated in Fig. 1, insures the establishment of a reactive force at the instant the valve is unseated in the same way as in the valve of Fig. 3, said reactive force assisting in raising the valve to full maximum capacity lift. However, this reactive force is immediately diminished when the ports 12 are registered with the orifices 11, for upon such registry a portion of the fluid which would normally be deflected sharply by the cylinder 8, is enabled to pass with a lesser degree of deflection through the ports 12 and orifices 11. The number and size of the ports and orifices will determine the proportion of the fluid which may thus pass without sharp deflection and will thus determine the degree of decrease in the reactive force resultant from the provision of the ports and orifices. Obviously this decrease in the reactive force will be progressive as the ports 12 (or the circumferential port 13) gradually come into registry with the orifices 11 and thus the reactive force correspondingly decreases progressively. On the other hand, as the upper ends of the ports 12 (or the groove 13) move upwardly out of registry with the orifices 11, the proportion of fluid which is not acted on by the deflecting guide 8 is gradually lessened and the reactive force correspondingly increases. By proper proportioning of the ports and orifices it is thus possible substantially to eliminate the hump H in the force curve and thus for any particular valve it is possible to insure an action such that the force curve 10$^a$, as indicated in Fig. 2, will closely approximate the spring curves. Thus while a maximum capacity high lift valve is obtained, the desired minimum blow down is at the same time assured.

While a very simple form of valve has been illustrated, it is to be understood that the invention is applicable to valves of other specific types whether provided with the usual blow-down ring or not, and by reason of the simplicity of the improved construction and the fact that the practice of the invention only necessitates the provision of suitable vent passages in commonly used parts, it is readily possible to embody the invention in existing valves of many prior types without great trouble or expense.

While one desirable embodiment of the invention has been illustrated by way of example, it is to be understood that the invention is not necessarily limited to the precise arrangement herein disclosed but is to be regarded as broadly inclusive of any and all modifications and arrangements such as fall within the scope of the appended claims.

I claim:

1. In combination in a pop safety valve having a valve seat, a valve head and a loading spring which normally holds the head seated, means operative only during the second half of the lift of the valve head from its seat, first to decrease the reactive force of the escaping fluid upon the valve head and then to increase said reactive force whereby the total effective force acting upon the valve head during the lift of the valve head is a substantially straight line function.

2. In combination in a pop safety valve having a valve seat, a valve head and a loading spring, a fixed deflector so disposed as to change the course of the fluid which escapes over the valve seat thereby establishing a reaction force tending to lift the valve head, said deflector having a delivery orifice through which fluid may pass with a lesser degree of deflection, and closure means normally closing said orifice, said closure means being constructed and arranged to open the orifice and again to close it while the valve head is traversing the second half of its lift.

3. In combination in a pop safety valve having a valve seat, a valve head and a loading spring which normally holds the head seated, a guide having a free end which is adjacent to the plane of the valve seat and which constitutes deflecting means for the fluid escaping over said seat, the guide having a delivery orifice therethrough at a point near its free end, and movable closing means for said delivery orifice, said closing means including a part which slides longitudinally of the guide, said part having therein a port for the passage of fluid, said slidable part being so connected to the valve head that during lift of the valve head from its seat the port is successively moved into and out of registry with the delivery orifice in the guide.

4. In combination in a pop safety valve having a valve seat, a valve head and a loading spring which normally holds the head seated, a cylindrical guide having a free end which is adjacent to the plane of the valve seat and which constitutes deflecting means for the fluid escaping over said seat, the guide having a plurality of radial delivery orifices therethrough at a point near its free end, and movable closing means for said delivery orifices, said closing means being so related to the valve head that during the lift of the latter from its seat the closure means gradually uncovers the delivery orifices and again covers the delivery orifices before the valve head reaches full lift.

5. In combination in a pop safety valve having a valve seat, a valve head and a loading spring which normally holds the head seated, a cylindrical guide having a free end which is adjacent to the plane of the valve seat and which constitutes deflecting means for the fluid escaping over said seat, the guide having a delivery orifice therethrough at a point near its free end, and movable closing means for said delivery orifice, said closing means including a sleeve which telescopes within the cylindrical guide and to whose lower end the valve head is connected, said sleeve having a port which is normally out of registry with the delivery orifice, the port and delivery orifice being so relatively located that during the second half of the lifting movement of the valve away from its seat the port is moved successively into and out of registry with the delivery orifice.

6. In combination in a pop safety valve having a valve seat, a valve head and a loading spring, a fixed cylinder coaxial with the valve seat and constituting a guide for the valve head, the lower end of said cylinder being so located as to deflect the fluid which escapes over the valve seat thereby establishing a reactive force tending to lift the valve head to full open position, a fixed cylinder having a series of circumferentially spaced substantially radial delivery orifices adjacent to its lower end, the valve head having a cylindrical skirt portion which telescopes within the fixed cylinder, said sleeve normally closing the entrances to said orifices, the valve head also having a series of inclined passages leading upwardly from points adjacent to but outside of the valve seat and terminating in a circumferential groove in the peripheral surface of the valve head, said passages and groove being so located and arranged that, when the valve head is traversing the upper half of its lift, the groove first registers with the delivery orifices and then moves out of registry with said orifices before the valve reaches the upper limit of its lift.

7. Method of controlling the operation of a pop safety valve having a seat and a spring-loaded head which normally engages the seat, whereby to insure a lift of the valve head from its seat sufficient to provide maximum discharge and minimum blow down, said method comprising as steps deflecting all of the fluid which escapes from the valve seat during the initial stages of valve lift thereby to establish a reactive force for moving the valve head in opposition to the loading spring and during the second half only of the valve lift first diminishing and then restoring the percentage of fluid so deflected.

EUGENE K. FALLS.